(12) United States Patent
Kast et al.

(10) Patent No.: US 10,577,997 B2
(45) Date of Patent: Mar. 3, 2020

(54) EXHAUST SYSTEM

(71) Applicant: Eberspächer Exhaust Technology GmbH & Co. KG, Neunkirchen (DE)

(72) Inventors: Peter Kast, Esslingen (DE); Tobias Wolf, Köngen (DE); Markus Henzler, Grafenberg (DE); Torsten Bucher, Korb (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 75 days.

(21) Appl. No.: 15/861,934

(22) Filed: Jan. 4, 2018

(65) Prior Publication Data

US 2018/0187586 A1    Jul. 5, 2018

(30) Foreign Application Priority Data

Jan. 5, 2017   (DE) .......................... 10 2017 100 132

(51) Int. Cl.
*F01N 3/36*        (2006.01)
*F01N 3/20*        (2006.01)

(52) U.S. Cl.
CPC ............. *F01N 3/36* (2013.01); *F01N 3/2066* (2013.01); *F01N 2240/20* (2013.01); *F01N 2610/02* (2013.01); *F01N 2610/1453* (2013.01); *Y02T 10/24* (2013.01)

(58) Field of Classification Search
CPC combination set(s) only.
See application file for complete search history.

(56) References Cited

U.S. PATENT DOCUMENTS

| | | | |
|---|---|---|---|
| 8,627,649 B2* | 1/2014 | Peters | B01F 3/04049 60/286 |
| 9,440,204 B2* | 9/2016 | Palmer | B01F 5/0473 |
| 9,617,895 B2* | 4/2017 | Mueller-Haas | F01N 3/2066 |
| 9,649,595 B2* | 5/2017 | Kowada | B01D 53/94 |
| 10,024,213 B2* | 7/2018 | Mitchell | F01N 3/28 |
| 2009/0071133 A1 | 3/2009 | Mabuchi | |
| 2009/0158722 A1* | 6/2009 | Kojima | B01F 3/04049 60/297 |
| 2011/0079003 A1* | 4/2011 | Sun | F01N 3/2066 60/310 |
| 2013/0098004 A1 | 4/2013 | Levin et al. | |

FOREIGN PATENT DOCUMENTS

| | | |
|---|---|---|
| CN | 102159810 A | 8/2011 |
| DE | 10 2008 042 536 A1 | 4/2009 |
| DE | 10 2007 052 262 A1 | 5/2009 |
| DE | 10 2008 044 364 A1 | 6/2009 |
| DE | 10 2008 028 616 A1 | 10/2009 |

(Continued)

*Primary Examiner* — Binh Q Tran
(74) *Attorney, Agent, or Firm* — McGlew and Tuttle, P.C.

(57) ABSTRACT

An exhaust system for an internal combustion engine includes an exhaust gas flow duct (14), through which exhaust gas can flow in an exhaust gas main flow direction (A), and a reactant injection device (18) for injecting reactant in a reactant injection area (16) of the exhaust gas flow duct (14) in a reactant main injection direction (R). The reactant main injection direction (R) and the exhaust gas main flow direction (A) in the reactant injection area (16) are not parallel and not at right angles to one another.

20 Claims, 3 Drawing Sheets

(56) References Cited

FOREIGN PATENT DOCUMENTS

| | | |
|---|---|---|
| DE | 10 2012 219 325 A1 | 4/2013 |
| DE | 10 2012 000 597 A1 | 7/2013 |
| DE | 11 2013 004008 T5 | 5/2015 |
| JP | 2010 121597 A | 6/2010 |
| JP | 2012 047109 A | 3/2012 |

* cited by examiner

EXHAUST SYSTEM

CROSS REFERENCE TO RELATED APPLICATIONS

This application claims the benefit of priority under 35 U.S.C. § 119 of German Application DE 10 2017 100 132.8, filed Jan. 5, 2017, the entire contents of which are incorporated herein by reference.

FIELD OF THE INVENTION

The present invention pertains to an exhaust system for an internal combustion engine.

BACKGROUND OF THE INVENTION

To guarantee especially in exhaust systems used in connection with diesel internal combustion engines that the increasingly strict legal requirements imposed on the emission of pollutants, especially on the emission of nitrogen oxides, can be met, a reactant, for example, a urea/water solution, is injected into the exhaust gas flowing in such exhaust systems. The nitrogen oxides contained in the exhaust gas are converted with the ammonia contained in the reactant into water and nitrogen by means of a selective catalytic reduction in an SCR catalytic converter device arranged downstream of the reactant injection area.

SUMMARY OF THE INVENTION

An object of the present invention is to provide an exhaust system for an internal combustion engine, with which exhaust system efficient evaporation and mixing of the reactant injected in a reactant injection area of an exhaust gas flow duct with exhaust gas flowing in the exhaust gas flow duct are achieved.

This object is accomplished according to the present invention by an exhaust system for an internal combustion engine, comprising an exhaust gas flow duct, through which exhaust gas can flow in an exhaust gas main flow direction, and a reactant injection device for injecting reactant in a reactant injection area of the exhaust gas flow duct in a reactant main injection direction, wherein the reactant main injection direction and the exhaust gas main flow direction in the reactant injection area are not parallel and not at right angles to one another.

Such a reactant main injection direction guarantees that the injected reactant can reach essentially all cross-sectional areas of exhaust gas flow duct without the exhaust gas stream in the exhaust gas flow duct being substantially compromised and it can be mixed there with exhaust gas.

To compromise the exhaust gas stream as little as possible in the process, it is proposed that the reactant main injection direction and the exhaust gas main flow direction in the reactant injection area be at an acute angle in relation to one another, the reactant main injection direction and the exhaust gas main flow direction in the reactant injection area preferably being at an angle in the range of 20° to 70° and preferably 40° to 60° in relation to one another.

The reactant injected through the reactant injection device, generally also called injector, enters the reactant injection area of the exhaust gas flow duct, in general, in the form of a spray or droplets. To achieve efficient mixing of the reactant with exhaust gas flowing in the exhaust gas flow duct, it is further proposed that a reactant collection device with a plurality of reactant collection surfaces, which can be wetted with reactant injected by means of the reactant injection device, be provided in the reactant injection area. The reactant collection surfaces, which can be wetted with reactant and are located in the exhaust gas stream, can be heated by the exhaust gas itself and thus they support the evaporation of the reactant reaching them and wetting them. Even when the reactant collection surfaces have a comparatively low temperature, for example, when an internal combustion engine is put into operation or is operated at a comparatively low load, they act as rebounding surfaces, from which reactant impacting on them and wetting them rebounds and is thus mixed efficiently and uniformly with the exhaust gas flowing around the reactant collection surfaces. At least two and preferably all reactant collection surfaces may be parallel to one another at least in some areas.

To provide the reactant collection surfaces, the reactant collection device may comprise at least one reactant collection surface element having at least one reactant collection surface.

To make it possible to provide a comparatively large total area of the reactant collection surfaces in a simple manner, it is proposed that at least one reactant collection surface element have an undulated configuration.

Further, a large total area of the reactant collection surfaces can be provided in a comparatively small installation space if at least two reactant collection surface elements are arranged nested in one another.

For a stable holding of the reactant collection device, it is proposed that at least one reactant collection surface element be fixed to an exhaust gas-guiding pipe preferably by welding.

A simple, but nevertheless compact configuration can be obtained by at least one reactant collection surface element being fixed to another reactant collection surface element preferably by welding. Provisions may be made, in particular, for a reactant collection surface element to be fixed to the exhaust gas-guiding pipe and for at least one additional reactant surface element to be carried on the one reactant collection surface element.

In order not to substantially compromise the exhaust gas stream in the exhaust gas flow duct by the provision of the reactant collection device, it is proposed that at least one and preferably each reactant collection surface extend essentially in the direction of the exhaust gas main flow direction in the area of the reactant injection area.

Provisions may be made in this connection, above all if the reactant injection area is located in a curved area of the exhaust gas flow duct, for at least one and preferably each reactant collection surface to be bent in at least some areas. The reactant collection surfaces can thus also act as flow guide surfaces for deflecting the exhaust gas stream in the reactant injection area.

If at least two reactant collection surfaces are arranged next to each other essentially at right angles to the exhaust gas main flow direction, the exhaust gas stream can be split into segments defined between two reactant collection surfaces each, which are arranged next to one another, and mixing of exhaust gas with reactant deflected or evaporated in the area of a respective reactant collection surface can then take place in each of these segments of the exhaust gas stream. A substantial portion of the reactant can thus be largely prevented from impinging on a wall of an exhaust gas flow pipe, which surrounds the exhaust gas flow duct and is comparatively cold especially in a start phase of the combustion operation.

To make it possible to improve the mixing of the reactant with exhaust gas flowing in the exhaust gas flow duct even more, it is proposed that at least two reactant collection surfaces be arranged one after another in the exhaust gas main flow direction in the reactant injection area.

It may further be proposed for an improved wetting of the reactant collection surfaces that at least two reactant collection surfaces have mutually different lengths of extension in the upstream direction opposite each other in the exhaust gas main flow direction in the reactant injection area. It can thus be guaranteed that reactant collection surfaces located next to each other do not mutually fully overlap each other and one of the surfaces thus shields the other surface against the injected reactant, especially if the reactant collection surfaces are located next to each other at right angles to the exhaust gas main flow direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
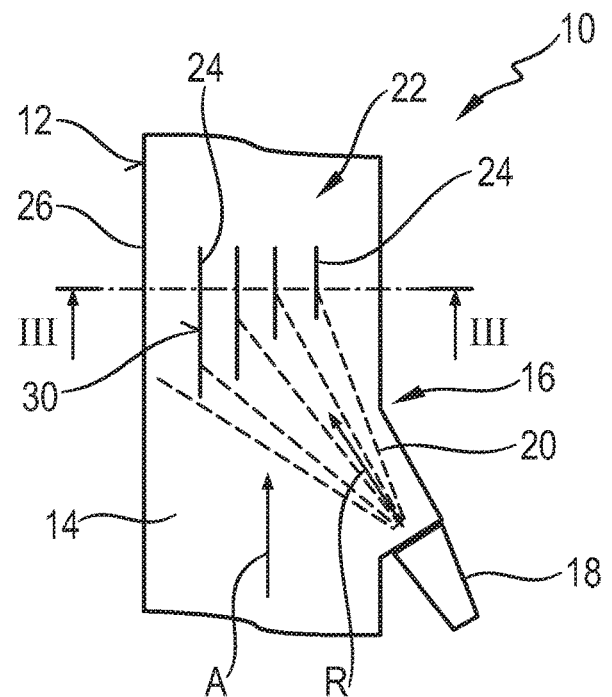
FIG. 1 is a schematic sectional diagram of an exhaust system for an internal combustion engine.

Referring to the drawings, FIG. 1 shows a section of an exhaust system 10 for an internal combustion engine. The exhaust system 10 comprises an exhaust gas flow pipe 12 having a one-part or multipart configuration, in which an exhaust gas flow duct 14, through exhaust gas can flow in an exhaust gas main flow direction A, is formed. It should be noted that deviations may, of course, occur locally in the flow direction of the exhaust gas from the exhaust gas main flow direction A, which are caused, for example, by turbulences or curved areas of the exhaust gas flow pipe 12.

Reactant is injected by means of a reactant injection device 18 into exhaust gas flowing in the exhaust gas flow duct 14 in the exhaust gas main flow direction A in a reactant injection area (region or zone) of the exhaust gas flow duct 14, which said reactant injection area is generally designated by 16. The reactant is released by the reactant injection device 18 in a reactant main injection direction R and it spreads in the reactant injection area 16 approximately in the form of a spray cone 20.

The reactant main injection direction, which may be approximately a central line R of the spray cone 20, and the exhaust gas main flow direction A in the reactant injection area 16 are at an acute angle to one another, i.e., they are not parallel to one another and they are also not at right angles to one another. This angle is preferably in the range of 20° to 70°.

A reactant collection device 22, which provides a plurality of reactant collection surfaces 24, is provided in the reactant injection area 16. The reactant collection surfaces 24 extend essentially in the exhaust gas main flow direction A, i.e., they are essentially parallel to this, so that the exhaust gas stream is prevented from being compromised in the exhaust gas flow duct 14. Since the reactant collection surfaces 24 are essentially parallel to the exhaust gas main flow direction A, they likewise form an essentially acute angle with the reactant main injection direction R. As is suggested in FIG. 1, the reactant injected by the reactant injection device 18 into the reactant injection area 16 impinges on the reactant collection surfaces 24 of the reactant collection device 22, which are essentially parallel to one another. The reactant can thus wet these reactant collection surfaces 24. Since exhaust gas flowing in the exhaust gas flow duct 14 flows around the reactant collection surfaces or reactant collection surface elements, which provide these and will be explained in more detail below, on both sides, the reactant surface elements are heated by the exhaust gas stream comparatively rapidly and thus they support the evaporation of reactant wetting the reactant collection surfaces 24 into the exhaust gas, as a result of which efficient mixing of the reactant with the exhaust gas, which flows through between the reactant collection surfaces 24 and is thus stratified, is achieved. Further, the reactant collection surfaces 24 arranged in the reactant injection area 16 shield a wall 26 of the exhaust gas flow pipe 12 from the reactant injected into the reactant area 16, so that it is guaranteed that the reactant remains in the generally hotter inner area of the exhaust gas stream and is mixed with the exhaust gas there. The reactant collection surface elements act as rebounding elements for the reactant impinging on and wetting them above all when the reactant collection surface elements providing the reactant collection surfaces 24 still have a comparatively low temperature, as a result of which the mixing of the reactant with the exhaust gas flowing in the exhaust gas flow duct 14 is likewise improved.

It is seen in FIG. 1 that the reactant collection surfaces located next to each other in the reactant injection area 16 at right angles to the exhaust gas main flow direction A have mutually different lengths of extension in relation to one another in the exhaust gas main flow direction A, and, in particular, they do not fully overlap each other especially in the upstream area. It is thus guaranteed that the reactant collection surfaces 24 do not mutually screen each other against the impingement of reactant injected onto them at an acute angle. Advantageous is in this connection an arrangement in which the reactant collection surface 24 located closest to the reactant injection device 18 at right angles to the exhaust gas main flow direction A, i.e., the reactant collection surface 24 positioned farther to the right in FIG. 1, is positioned or begins farthest downstream, whereas a reactant collection surface 24 positioned farthest from the reactant injection device 18 is arranged or begins farthest upstream.

Figure 2:
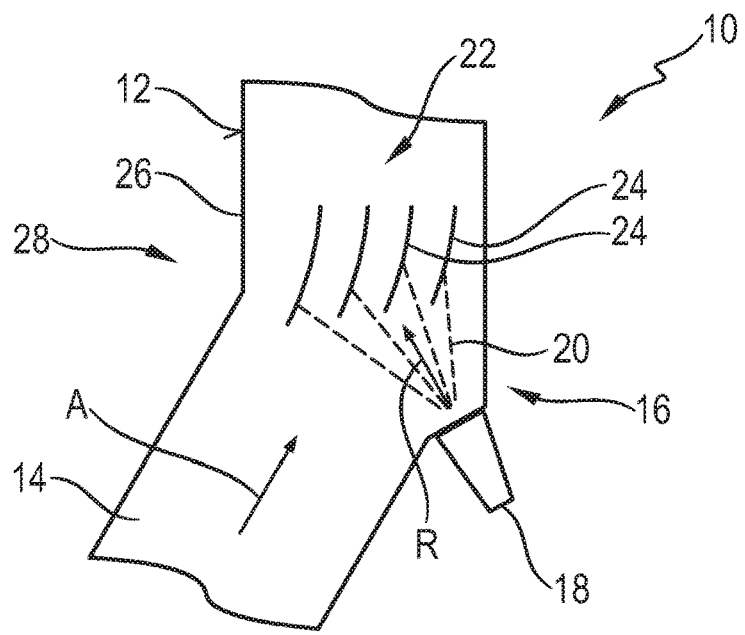
FIG. 2 is a sectional diagram of an alternative embodiment of an exhaust system for an internal combustion engine.

FIG. 2 shows an embodiment of an exhaust system 10, in which the reactant injection area 16 is positioned in a kinked area 28 of the exhaust gas flow pipe 12 or of the exhaust gas flow duct 14 positioned therein. The exhaust gas main flow direction A in the reactant injection area 16 and the reactant main injection direction R form an essentially acute angle with one another, which may be in the value range indicated above, in this embodiment as well.

Adapted to the angular configuration of the exhaust gas flow pipe 12, the reactant collection surface and the reactant collection surface elements of the reactant collection device 22, which reactant collection elements have this reactant collection surface, have a curved configuration, so that they are additionally also used to deflect the exhaust gas stream in the reactant injection area 16. Based on this deflection brought about by the reactant collection surface elements, intensified swirling is generated in the area of the reactant collection device 22, which further improves the mixing of exhaust gas and reactant evaporated or rebounded on the reactant collection surfaces 24.

Figure 3:
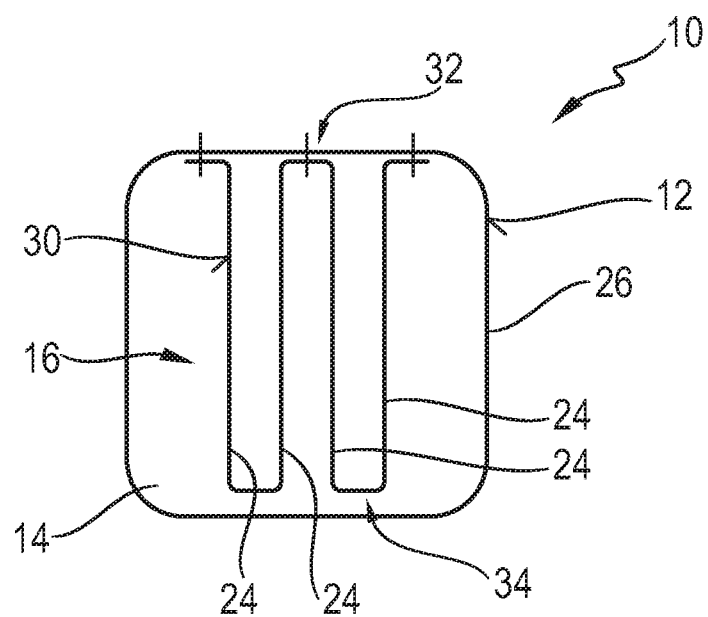
FIG. 3 is a cross-sectional view of the exhaust system according to FIG. 1, cut along a line III-III in FIG. 1.

FIG. 3 shows an embodiment of a reactant collection device 22 with a reactant collection surface element 30 configured with an undulated shape, which may also be termed a wave shape or peek and trough shape. The reactant collection surface element 30 is preferably fixed to the wall 26 of the exhaust gas flow pipe 12 preferably by welding, for example, resistance welding, in the area of wave crests 32, preferably in an area of the exhaust gas flow pipe 12, which area is an upper area in a vertical direction, in an exhaust system 10 integrated in a vehicle. Collections of reactant can be avoided in this manner in the area of this connection of the reactant collection surface element 30 to the wall 26 of the exhaust gas flow pipe 12. The other crest areas 34 of the reactant collection surface element 30 are preferably not in contact with the wall 26 of the exhaust gas flow pipe 12, so that the reactant collection surface element 30 can expand without the risk of crowding or deformations in the exhaust gas stream.

The reactant collection surface element 30 shown in FIG. 3 provides, on the whole, four reactant collection surfaces 24 located facing the reactant injection device 18. It is obvious that more such reactant collection surfaces 24 may also be provided in case of a greater number of waves. A plurality of such reactant collection surface elements 30 having an undulated configuration may also be arranged next to each other at right angles to the exhaust gas main flow direction A or arranged following one another in the exhaust gas main flow direction A. The number of reactant collection surfaces, which are provided located next to each other at right angles to the exhaust gas main flow direction or/and which are arranged following one another in the exhaust gas main flow direction, as well as the lengths of extension of the reactant collection surfaces 24 in the exhaust gas main flow direction or starting from the area of fixation to the wall 26 into the exhaust gas flow duct 14 may be selected as a function of the particular quantity of injected reactant that is necessary in a particular exhaust system 10. The shorter the extension of the reactant collection surfaces 24 at right angles to the exhaust gas main flow direction A or in the exhaust gas main flow direction A, the smaller is their contribution to the evaporation of the reactant and the more pronounced is their function as rebounding elements, on which the reactant impinging on these rebounds and is mixed in this manner more intensely with exhaust gas flowing in the exhaust gas flow duct 14.

Figure 4:
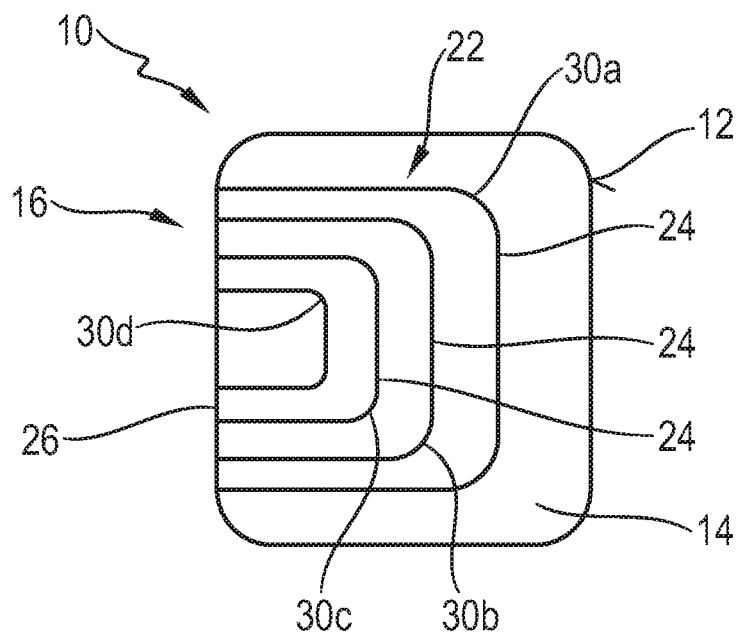
FIG. 4 is a cross-sectional view corresponding to FIG. 3 of an alternative embodiment of the exhaust system.

An alternative embodiment of the reactant collection device 22 is shown in FIG. 4. The reactant collection device 22 has, for example, four reactant collection elements 30a, 30b, 30c, 30d, which are nested in one another, in this configuration. The reactant collection elements 30a, 30b, 30c, 30d have an essentially U-shaped cross section and are fixed to the wall 26 of the exhaust gas flow pipe 12, for example, by welding, in the area of the free ends of their respective U legs. On their side facing the reactant injection device 18 at right angles to the exhaust gas main flow direction A, the four reactant collection surface elements 30a, 30b, 30c, 30d have a respective reactant collection surface 24 each.

Figure 5:
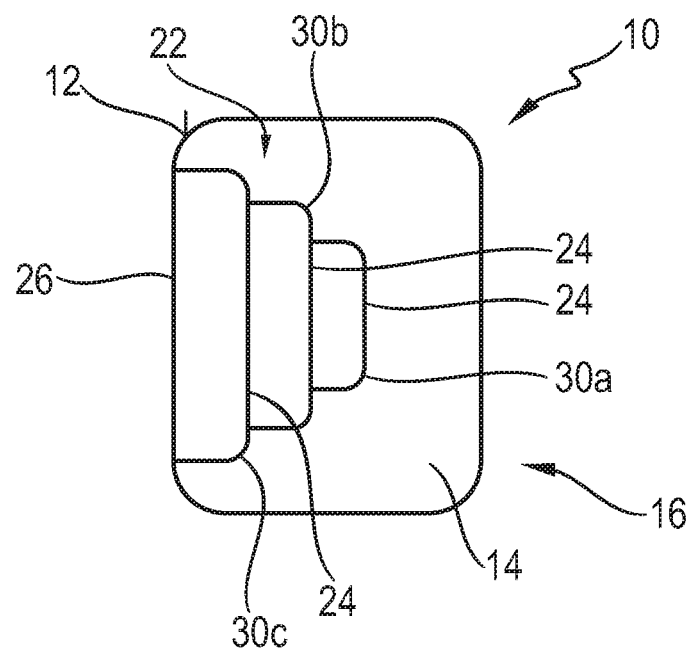
FIG. 5 is another cross-sectional view corresponding to FIG. 3 of an alternative embodiment of the exhaust system.

The embodiment of the reactant collection device 22 shown in FIG. 5 comprises three reactant collection surface elements 30a, 30b, 30c, which have an essentially U-shaped cross-sectional configuration and provide a respective reactant collection surface 24 each on their side facing the reactant injection device 18 at right angles to the exhaust gas main flow direction A. The reactant collection surface element 30a positioned closest to the reactant injection device 18 is fixed in the free end area of its U legs in the area of the reactant collection surface 24a of the next reactant collection surface element 30b following it, for example, by welding. This reactant collection surface element 30b is fixed in the area of the free ends of its U legs to the reactant collection surface element 30c in the area of the reactant collection surface 24 thereof. The two reactant collection surface elements 30a, 30b are thus carried on the wall 26 via the reactant collection surface element 30c fixed with its U legs to the wall 26 of the exhaust gas flow pipe 12.

Figure 6:
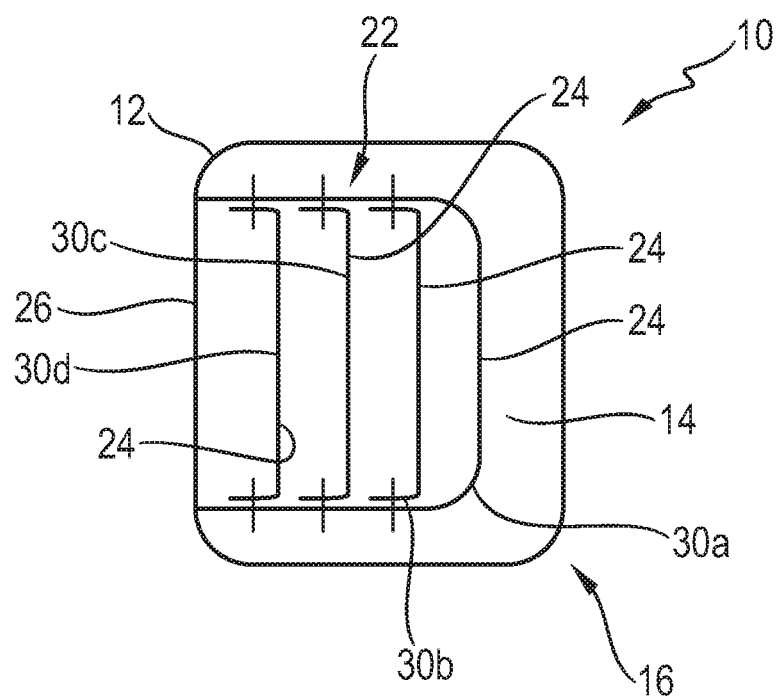
FIG. 6 is another cross-sectional view corresponding to FIG. 3 of an alternative embodiment of the exhaust system.

In the embodiment shown in FIG. 6, the reactant collection device 22 has four reactant collection surface elements 30a, 30b, 30c, 30d. The reactant collection surface element 30a provided essentially in the shape of a U is fixed in the area of the free ends of its U legs to the wall 26 of the exhaust gas flow pipe 12 and provides the reactant collection surface 24 positioned closest to the reactant injection device 18. Three reactant collection surface elements 30b, 30c, 30d are arranged preferably at uniformly spaced locations from one another at right angles to the exhaust gas main flow direction A in the interior of the U contour of the reactant collection surface element 30a, and these reactant collection surface elements 30b, 30c, 30d may also have a U shape and may be connected in the area of their U legs to the reactant collection surface element 30a, for example, by welding, and they may thus be carried via this on the wall 26. Similarly to the embodiment shown in FIG. 4, the reactant collection surface elements 30a, 30b, 30c, 30d are arranged nested in one another in this case as well.

The reactant collection surface elements 30 as well as 30a, 30b, 30c, 30d, which have an essentially lamellar configuration, are preferably formed from sheet metal material in all the embodiments of the reactant collection device 22 described above with reference to FIGS. 3 through 6. The reactant collection device 22 may have in all embodiments the offset or offset start of its respective reactant collection surfaces 24 which can be seen in FIGS. 1 and 2 in the upstream area.

Approximately uniform reactant evaporation and rebounding of the reactant over the cross section of the exhaust gas flow duct 14 are brought about by the acute angle between the exhaust gas main flow direction A and the reactant main injection direction R, which angle is provided according to the present invention, and facilitated by the reactant collection surfaces 24 located in the reactant injection area 16, so that the reactant can also be mixed with exhaust gas flowing in the exhaust gas flow duct 14 approximately uniformly over the cross section, especially also in a state of cold start or in an operating state with low load and correspondingly low emission of pollutants. This guarantees efficient mixing of the exhaust gas with reactant and correspondingly also an efficient performance of the selective catalytic reduction at the SCR catalytic converter device located downstream of the reactant injection area 16.

It should finally be noted that, in particular, the geometry of the cross section of both the exhaust gas flow pipe 12 and of the reactant collection device 22 may, of course, differ from the cross-sectional geometry shown. In particular, the exhaust gas guide pipe 12 could also have an essentially round cross-sectional geometry.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
    an exhaust gas flow duct formed in an exhaust gas flow pipe, the exhaust gas duct being configured for exhaust gas flow therethrough, in an exhaust gas main flow direction;
    a reactant injection device injecting reactant in a reactant injection area of the exhaust gas flow duct in a reactant main injection direction, wherein the reactant main injection direction and the exhaust gas main flow direction in the reactant injection area are not parallel and not at right angles to one another;
    a reactant collection device in the reactant injection area, the reactant collection device comprising a plurality of reactant collection surfaces that are wetted with reactant injected by the reactant injection device, the reactant collection device comprising at least one reactant collection surface element having at least one of the reactant collection surfaces, wherein:
    the at least one reactant collection surface element of the at least the reactant collection device has an undulated configuration with wave crests and with other wave crests;
    the at least one reactant collection surface element is fixed to a wall of the exhaust gas flow pipe in an area of the wave crests and is not in contact with the wall of the exhaust gas flow pipe in an area of the other wave crests.

2. An exhaust system in accordance with claim 1, wherein the reactant main injection direction and the exhaust gas main flow direction in the reactant injection area are at an acute angle to one another.

3. An exhaust system in accordance with claim 2, wherein the reactant main injection direction and the exhaust gas main flow direction in the reactant injection area are at an angle in the range of 20° to 70° to one another.

4. An exhaust system in accordance with claim 1, wherein at least two of the reactant collection surfaces are parallel to one another in at least some areas.

5. An exhaust system in accordance with claim 1, wherein:
    the at least one reactant collection surface element is fixed to the exhaust gas flow pipe by welding.

6. An exhaust system in accordance with claim 1, wherein at least one of the reactant collection surfaces extends essentially in the direction of the exhaust gas main flow direction in the reactant injection area.

7. An exhaust system in accordance with claim 1, wherein at least one of the reactant collection surfaces is curved in at least some areas.

8. An exhaust system in accordance with claim 1, wherein at least two reactant collection surfaces are arranged next to each other essentially at right angles to the exhaust gas main flow direction.

9. An exhaust system in accordance with claim 1, wherein at least two reactant collection surfaces are arranged in the reactant injection area following one another in the exhaust gas main flow direction.

10. An exhaust system in accordance with claim 1, wherein at least two reactant collection surfaces have mutually different lengths of extension in the reactant injection area in the upstream direction opposite the exhaust gas main flow direction.

11. An exhaust system in accordance with claim 2, wherein the reactant main injection direction and the exhaust gas main flow direction in the reactant injection area are at an angle in the range of 40° to 60° to one another.

12. An exhaust system for an internal combustion engine, the exhaust system comprising:
    an exhaust gas flow pipe comprising a wall defining an exhaust duct through which exhaust gas flows, the exhaust gas flow pipe being configured for the exhaust gas to flow in an exhaust gas main flow direction;
    a reactant injection device fixed to the exhaust gas flow pipe and configured to inject reactant into a reactant injection area within the exhaust gas flow pipe duct and configured to direct the injected reactant in a reactant main injection direction that is not parallel to the exhaust gas main flow direction and is not at right angles to the exhaust gas main flow direction;
    a reactant collection device disposed within the exhaust gas flow pipe in the reactant injection area, the reactant collection device comprising a reactant collection surface element providing at least one of a plurality of the reactant collection surfaces of the reactant collection device, wherein:
    the reactant collection surface element comprises an undulated configuration with connection side wave crests at a connection side of the configuration and with opposite side wave crests at an opposite side of the configuration, the connection side wave crests being spaced apart from the opposite side wave crests; and
    at least a portion of the connection side of the configuration is fixed to an inner side of the wall of the exhaust gas flow pipe to position the undulated configuration within the exhaust duct with the opposite wave crests spaced apart from the inner wall of the exhaust gas flow pipe.

13. An exhaust system in accordance with claim 12, wherein the reactant main injection direction and the exhaust gas main flow direction in the reactant injection area are at an acute angle to one another.

14. An exhaust system in accordance with claim 13, wherein the reactant main injection direction and the exhaust gas main flow direction in the reactant injection area are at an angle in the range of 20° to 70° to one another.

15. An exhaust system in accordance with claim 13, wherein the reactant main injection direction and the exhaust gas main flow direction in the reactant injection area are at an angle in the range of 40° to 60° to one another.

16. An exhaust system in accordance with claim 12, wherein at least two of the plurality of reactant collection surfaces are parallel to one another in at least some areas.

17. An exhaust system in accordance with claim 12, wherein the at least one reactant collection surface element is fixed to the exhaust gas flow pipe by welding.

18. An exhaust system in accordance with claim 12, wherein at least two of the plurality of reactant collection surfaces are arranged in the reactant injection area following one another in the exhaust gas main flow direction.

19. An exhaust system in accordance with claim 12, wherein:
- the reactant collection surface element comprises a plurality of reactant collection surfaces;
- the wave crests at a connection side include at least two connection side wave crests, each of the at least two connection side wave crests having a wave crest surface with a fixation area fixed to the inner wall of the exhaust gas flow pipe; and
- each of the plurality of reactant collection surfaces of the reactant collection surface element connects one of the wave crests at a connection side to at least one of the opposite side wave crests.

20. An exhaust system in accordance with claim 19, wherein the reactant collection surface element comprises at least four reactant collection surfaces.

* * * * *